(12) United States Patent  
Nameche

(10) Patent No.: US 6,694,541 B2
(45) Date of Patent: *__Feb. 24, 2004__

(54) TRANSPARENT FITTING FOR SPAS AND THE LIKE

(75) Inventor: Larry J. Nameche, Plainwell, MI (US)

(73) Assignee: Sherwood-Templeton Coal Company, Inc., Terre Haute, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,734

(22) Filed: Aug. 15, 2002

(65) Prior Publication Data

US 2002/0189010 A1 Dec. 19, 2002

Related U.S. Application Data

(63) Continuation-in-part of application No. 09/707,869, filed on Nov. 7, 2000.

(51) Int. Cl.[7] ............................................. E04H 4/12
(52) U.S. Cl. ......................... 4/541.1; 4/541.6; 4/493; 4/506; 4/509; 4/507
(58) Field of Search ............................ 4/541.1–541.6, 4/492, 493, 506, 507, 509; 285/332, 332.1, 332.2, 332.3

(56) References Cited

U.S. PATENT DOCUMENTS

| | | | | |
|---|---|---|---|---|
| 3,778,089 A | * | 12/1973 | Fredd | ........................ 285/39 |
| 3,841,668 A | | 10/1974 | Williams | |
| 3,943,580 A | | 3/1976 | Carter | |
| 4,013,309 A | * | 3/1977 | Quick | ........................ 285/31 |
| RE31,123 E | * | 1/1983 | Simmons | ..................... 285/334 |
| 4,416,420 A | | 11/1983 | Thompson | |
| 4,670,207 A | | 6/1987 | Yamada et al. | |
| 4,804,210 A | | 2/1989 | Hancock | |
| 5,376,717 A | | 12/1994 | Patel et al. | |
| 6,125,538 A | * | 10/2000 | Vadas | ..................... 29/890.144 |
| 6,460,202 B1 | | 10/2002 | Nameche | |

FOREIGN PATENT DOCUMENTS

| | | |
|---|---|---|
| JP | 5597922 | 7/1980 |
| JP | 510490 | 1/1993 |

OTHER PUBLICATIONS

Exhibit A is Dura Plastic Products, Inc. promotional material, describing clear fittings offered for sale at least as early as Nov. 6, 1999.
Exhibit B is Harvel Plastics, Inc. promotional material, describing clear fittings offered for sale at least as early as Nov. 6, 1999.

* cited by examiner

Primary Examiner—Henry Bennett
Assistant Examiner—Azy Kokabi
(74) Attorney, Agent, or Firm—Price, Heneveld, Cooper, DeWitt & Litton, LLP

(57) ABSTRACT

A fitting for connecting to an end of tubing. The fitting includes a fitting body having a generally tubular construction with a first end adapted for leakproof connection to another component. A second end has a socket connector with tapered interior sidewall portions forming a truncated conical shape such that an end of a tube can be inserted into the socket connector and tightly wedged therein to form a leakproof seal. At least a portion of the fitting body is made of a light-transmitting material such that material lodged within the fitting body is visible from the exterior of the fitting body.

10 Claims, 2 Drawing Sheets

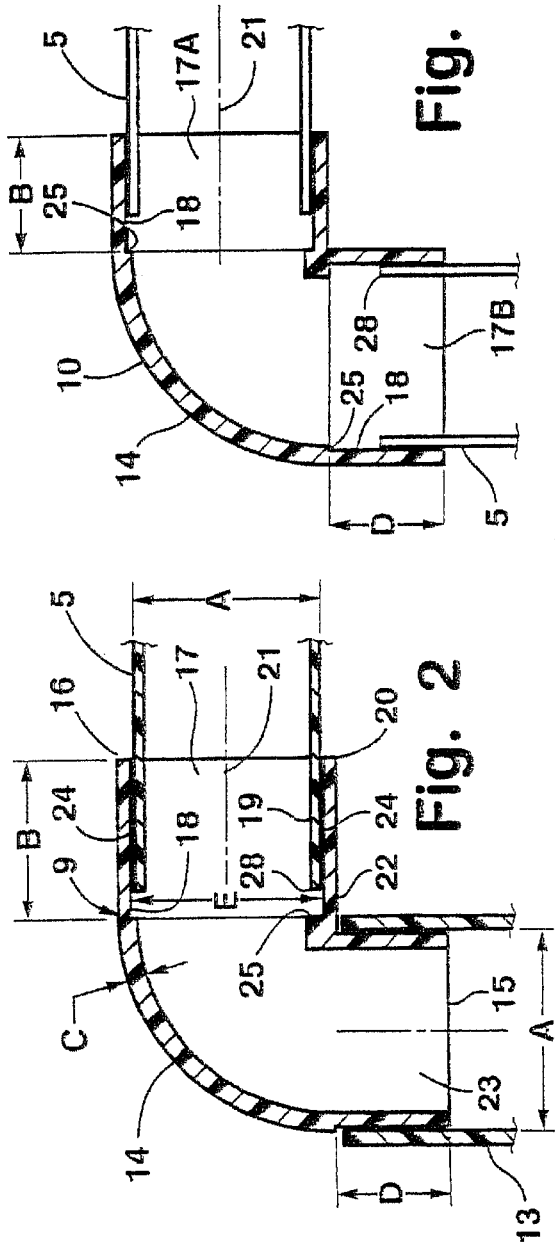
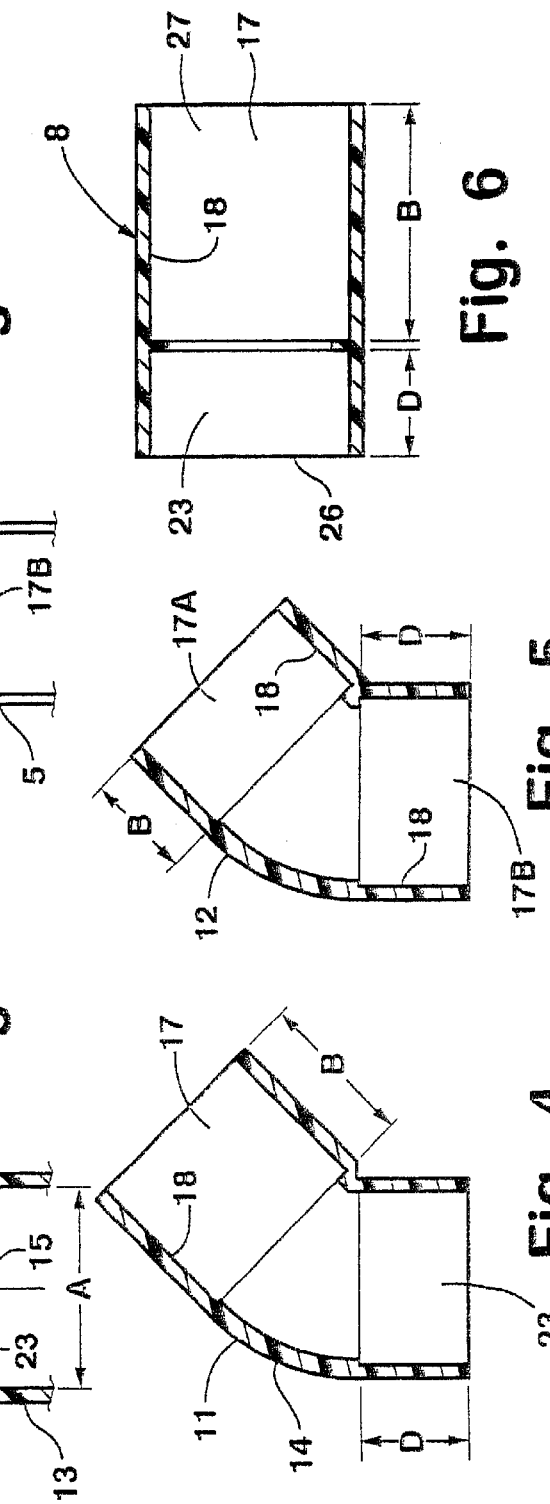

TRANSPARENT FITTING FOR SPAS AND THE LIKE

CROSS-REFERENCE TO RELATED APPLICATIONS

The present application is a Continuation-In-Part of U.S. patent application Ser. No. 09/707,869, entitled TRANSPARENT FITTING FOR SPAS AND THE LIKE, and filed on Nov. 7, 2000, now issued U.S. Pat. No. 6,460,202, the entire contents of which is hereby incorporated herein by reference.

BACKGROUND OF THE INVENTION

Various spas, hot tubs, swimming pools, and waterscapes and the like have been developed. Known spas/hot tubs include a tank having sufficient size to immerse one or more occupants when filled with water. One or more jets in the tank circulate the water to promote relaxation of the individual in the tank. The jets are commonly connected to a heater that heats the water, and a pump that circulates water through the system, and supplies water to the jets in the tank. In addition to such spas/hot tubs, existing pools may also utilize a fluid recirculation system including a pump, filter, and heater. The fluid recirculation systems of spas, hot tubs, pools, and the like commonly include reinforced flexible tubing that is connected to the heater, pump, or other component via "deep socket" fittings that are designed to provide a more secure seal when utilized with such reinforced spa tubing. However, existing water circulation systems may suffer from various drawbacks. For example, objects or other matter may become lodged in the recirculation system, thus partially or completely blocking fluid flow through the system. Furthermore, known fittings may leak due to improper assembly or the like. Accordingly, a fitting that alleviated such drawbacks would be beneficial.

Although clear fittings have been used, known applications for clear fittings include food and pharmaceutical plants, laboratories, hospitals and chemical installations or other such applications requiring high purity. The tubing utilized in such applications is commonly a thin wall rigid tubing that is operated under relatively low pressure conditions. Such low pressure tubing has a relatively smooth outer surface, such that a shallow socket fitting may be utilized to provide a sufficient connection. However, such shallow socket fittings do not generally provide an adequate seal for use with reinforced flexible spa tubing due to the rough outer surface on the tubing resulting from the reinforcement, as well as the high pressure and temperature requirements of spa applications.

SUMMARY OF THE INVENTION

One aspect of the present invention is a fitting for connecting to an end of tubing. The fitting includes a fitting body having a generally tubular construction with a first end adapted for leakproof connection to another component. A second end has a socket connector with tapered interior sidewall portions forming a truncated conical shape such that an end of a tube can be inserted into the socket connector and tightly wedged therein to form a leakproof seal. At least a portion of the fitting body is made of a light-transmitting material such that material lodged within the fitting body is visible from the exterior of the fitting body.

Another aspect of the present invention is a spa system including a tank having sufficient size to immerse at least a substantial portion of a user when the tank is filled with water. The spa system includes a powered water pump and a flow through heater. A tubing assembly interconnects the tank, water pump, and heater to form a continuous loop capable of circulating water through the tank, heater, and pump. The tubing assembly includes a section of flexible tubing having sufficient flexibility to permit manual bending thereof without the use of tools. The tubing assembly further includes at least one fitting securing an end of the section of flexible tubing to a selected one of the pump, heater, and tank. At least a portion of the fitting is substantially transparent, such that material lodged within the fitting is visible from the exterior thereof.

Yet another aspect of the present invention is a method of detecting obstructions in a fluid circulation system of a spa. The method includes providing a spa having a tank of sufficient size to immerse at least a substantial portion of a user when the tank is filled with water. The spa has a fluid circulation system including a pump and a heater. The fluid circulation system includes at least a section of tubing and a fitting connecting the section of tubing to a selected one of the tank, pump, and heater. The fitting has at least a portion thereof constructed of a light-transmitting material. The method includes actuating the pump to circulate water through the fluid circulation system, and the fitting is visually inspected to determine if an obstruction is lodged in the fitting.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is a cross-sectional view of the ninety degree fitting of FIG. 1;

FIG. 3 is a cross-sectional view of another embodiment of an ninety degree fitting;

FIG. 4 is a cross-sectional view of the forty five degree fitting of FIG. 1;

FIG. 5 is a cross-sectional view of a second embodiment of the forty five degree fitting; and FIG. 6 is a cross-sectional view of the in-line fitting of FIG. 1.

DETAILED DESCRIPTION OF PREFERRED EMBODIMENT

Figure 1:
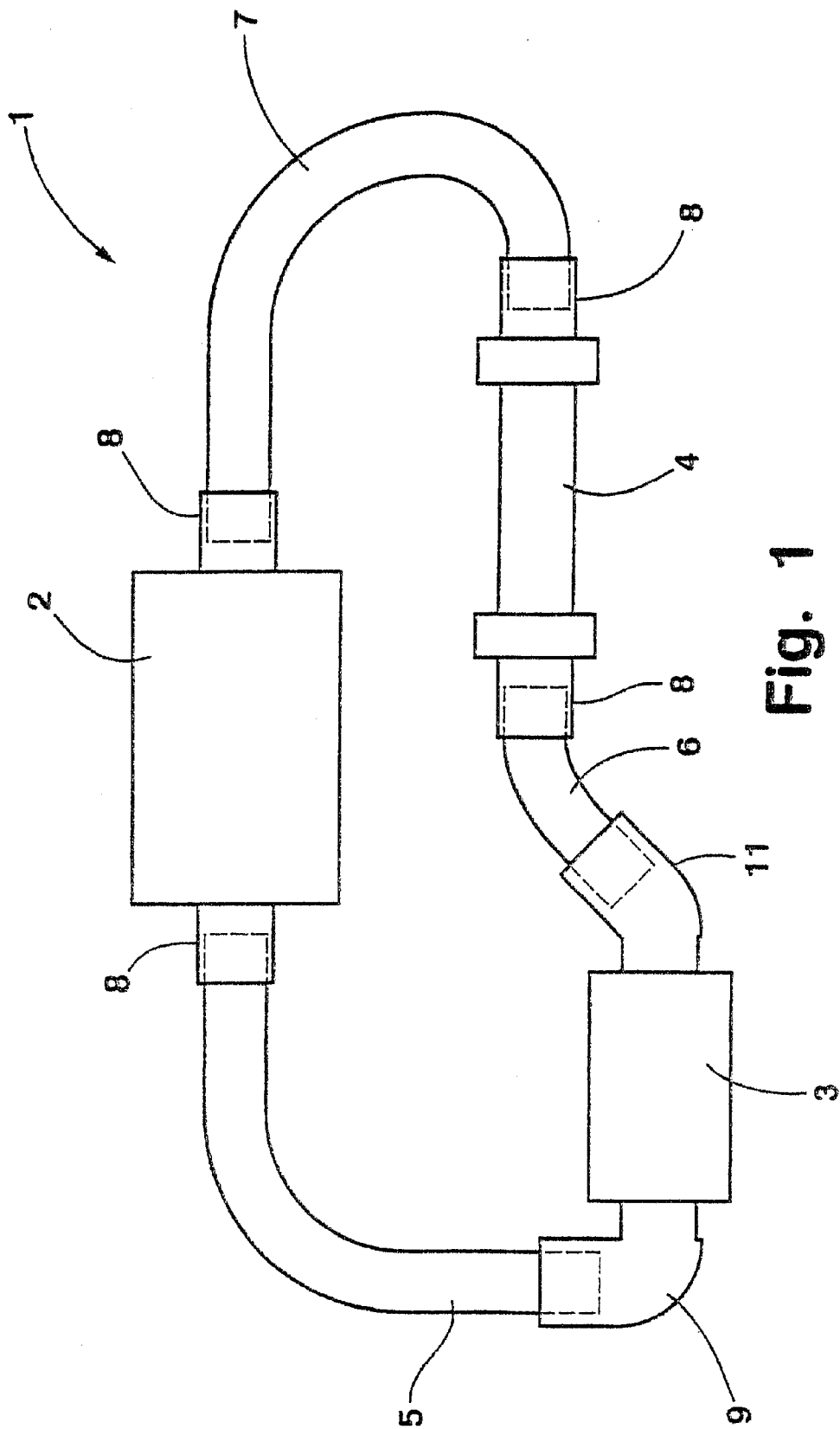
FIG. 1 is a schematic view of a spa system including transparent fittings according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a spa system 1 includes a tank 2 having sufficient size to immerse at least a substantial portion of a user when the tank is filled with water. The spa system 1 also includes a pump 3 and flow through heater 4. Flexible tubing sections 5, 6 and 7 are connected to the tank 2, pump 3, and heater 4 by fittings 8, 9 and 11. With further reference to FIG. 2, fitting 9 includes a fitting body 14 having a generally tubular construction with a first end 15 adapted for leakproof connection to another component such as the pump inlet/outlet 13. The second end 16 of the fitting body 14 has a socket connector 17 with tapered interior sidewalls 18 forming a truncated conical shape such that an end 19 of a flexible tube 5 can be inserted into the socket connector 17 and tightly wedged therein to form a leakproof seal. At least a portion of the fitting body 14 is made of a light-transmitting material such that material lodged within the fitting body 14 is visible from the exterior of the fitting body 14.

The spa or hot tub 1 of FIG. 1 includes a commercially available tank 2 that is of a known, conventional construction, including water jets to agitate the water within the tank 2. The pump 3 and heater 4 are also commercially available units having a conventional construction known in the spa/hot tub field. The flexible tubing sections 5, 6 and 7 are of a known construction, such as polyvinyl chloride (PVC), AQUA-FLEX hose available from Tek-Tube Inc. of Las Vegas, Nev. This hose is reinforced with rigid PVC, and, consequently, has a rough outer surface that may cause difficulties in achieving a secure, leak free connection with fittings. In the illustrated example, the flexible tubing has a nominal diameter of 2 inches, with an actual outside diameter of 2.375 inches, and may bend to a radius of about 6 inches. Such flexible tubing for hot tub and spa applications is designed to operate at relatively high pressures and temperatures. This tubing commonly includes reinforcing material that results in a relatively rough outer surface that may create difficulties in achieving a secure, sealed connection if the flexible tubing is installed into a fitting having a shallow socket. Accordingly, prior art fittings having a relatively deep, tapered socket have been developed for use with AQUA-FLEX hose and other such hoses having similar construction.

The fitting body 14 is made of a "virgin" pure PVC material that is substantially transparent. In the example illustrated in FIG. 2, the deep socket connector 17 has a diameter "A" of 2.387 inches at the edge 20 of the deep socket 17. The sidewall 18 tapers at about one degree relative to the axis 21 of socket 17, such that the diameter "E" at the inner end 22 of socket 17 is less than the outer diameter of the flexible tubing 5. Although a taper angle of about one degree is presently preferred, it is anticipated that sidewall 18 could taper at angles of, for example, two degrees, three degrees, or greater. Also, it is anticipated that the sidewall 18 could taper at less than one degree, such as one half of a degree, and the depth "B" of socket 17 could be made greater to ensure a proper, tight interference fit. The deep socket connectors 17 terminate at an annular edge or wall 25 that prevents excessive insertion of the tubing 5. When assembled, edge 28 of tube 5 is preferably directly adjacent, or abutting annular ridge or wall 25. In the illustrated example, the deep socket connector 17 has a depth "B" of 2.450 inches, and the sidewall "C" of the fitting is in the range of 0.154 to 0.198 inches. A standard socket 23 has a depth "D" of 1.156 inches and fits into an inlet or outlet 13 of a pump 3 or heater 4, or other component. Because socket 23 is of a conventional design, it will not be described in detail herein. A thin layer of colored adhesive 24 is disposed between the tube 5 and the sidewall 18 of the socket connector 17, and secures the flexible tubing 5 to the fitting body 14, and also provides a sealed, leakproof connection.

The transparency of the fitting body 14 permits the assembler to visually inspect the joint after assembly to ensure that the colored adhesive 24 is fully distributed between the sidewall 18 and the tube 5 to ensure that a proper connection has been made. A variety of commercially available adhesives may be utilized. For example, CPVC primer and glue adhesive, available from Instant Plastics Systems Co. of Gardena, Calif. includes a green coloring agent and provides a leakproof joint. Because the sidewalls 18 of socket 17 taper inwardly to a dimension "E" that is smaller than the outer diameter of the tubing 5, the tubing 5 is tightly wedged in the socket 17 during assembly, thereby forming a tight interference fit. As discussed above, in a preferred embodiment, the angle of taper of sidewalls 18 is about one degree. This angle permits manual insertion of tube 5, without the use of tools, while also providing sufficient interference to form a tight, leakproof seal.

With reference to FIG. 3, a second embodiment of the ninety degree fitting of FIG. 2 includes a pair of tapered socket connectors 17A and 17B, such that two sections of flexible tubing 5 can be joined at a ninety degree angle relative to one another. The socket connectors 17A and 17B have substantially the same dimensions as illustrated in FIG. 2, except that socket 17B has a depth "D" of 2.450 inches.

The fitting 11 of FIG. 4 is substantially the same as the fitting illustrated in FIG. 2, except that the sockets 17 and 23 form a forty five degree angle relative to one another. Tapered socket connector 17 and conventional or standard socket 23 permit connection of flex tubing to a component such as pump 3 or heater 4 at a forty five degree angle. The tapered socket connector 17 of fitting 11 has a depth "B" of 2.450 inches, and socket 23 has a depth "D" of 1.156 inches. A second embodiment of the forty five degree fitting is illustrated in FIG. 5. The second embodiment 12 of the forty five degree fitting includes a pair of tapered socket connectors 17A and 17B to permit connection of sections of flexible tubing at forty five degrees relative to one another. Socket 17A has a depth "B" of 2.450 inches, and socket 17B has a depth "D" of 2.450 inches. The in-line fitting 8 of FIG. 6 includes a standard socket 23 at a first end 26 having a depth "D" of 1.156 inches, and a tapered deep socket 17 at a second end 27 having a depth "B" of 2.450 inches.

The geometry of the fittings described above, including the dimensions of the deep sockets, is known in the spa/hot tub art. However, such existing deep socket fittings are not transparent, such that use of the transparent fittings described above for such applications is not believed to be known. The fittings described above preferably conform to ASTM D-2466 which covers PVC Schedule 40 type pipe fittings. More specifically, for size 2 (pipe O.D. of 2.375 inches) this standard provides that the entrance diameter of the socket has a diameter in the range of 2.381 to 2.393 inches, and a bottom diameter (i.e. at ridge 25, FIGS. 2 and 3) in the range of 2.375 to 2.363 inches, with a minimum depth of 1.370 inches. As discussed above, the deep socket fittings of the present application preferably have a depth of at least about 2.450 inches. Although this depth is preferred in order to provide a secure, leak free connection, the sockets could also have a somewhat smaller depth of around 2.000–2.250 inches and still provide an adequate seal.

During assembly, colored adhesive 24 can be deposited on the end of the flex hose and/or on the tapered sidewalls 18. The end 19 of the flex tube is then inserted into socket 17 and rotated and/or shifted axially to distribute adhesive 24 if required to achieve uniform distribution of adhesive 24 on sidewalls 18 of socket 17, 17A or 17B. The fitting is then visually inspected to ensure proper distribution of the adhesive 24, and the tube is shifted as required to evenly distribute the adhesive 24.

The transparent fittings of the present invention permit visual inspection to determine if objects or other matter have become lodged in the fittings, such that the blockage can be easily located and removed.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A spa system, comprising:

a tank having sufficient size to immerse at least a substantial portion of a user when said tank is filled with water;

a powered water pump;

a heater; and a tubing assembly interconnecting said tank, water pump, and heater to form a continuous loop capable of transporting water through said tank, heater, and pump, said tubing assembly including a section of flexible tubing having sufficient flexibility to permit manual bending thereof without the use of tools, said tubing assembly further including at least one fitting securing an end of said section of flexible tubing to a selected one of said pump, heater, and tank, at least a portion of said fitting being substantially transparent such that material lodged within said fitting is visible from the exterior thereof, said fitting having an opening defining a peripheral edge and a tapered socket having an inner sidewall defining a conical shape with a taper angle in the range of one half of a degree to three degrees, said tubing assembly including adhesive bonding and sealing said flexible tubing to said at least one fitting.

2. The spa system set forth in claim 1, wherein:

said tubing has an outer diameter of about 2.375 inches; and said sockets each define an inner diameter proximate said annular ridge that is less than 2.375 inches to provide a tight interference fit with said tubing.

3. The spa system set forth in claim 1, wherein:

said tapered socket includes an annular ridge spaced apart from said peripheral edge to define a depth of at least about 2.45 inches.

4. The spa system set forth in claim 1, wherein:

said tapered socket includes an annular ridge spaced apart from said peripheral edge to define a depth of at least about 2.00 inches.

5. A spa system, comprising:

a tank having sufficient size to immerse at least a substantial portion of a user when said tank is filled with water;

a powered water pump;

a flow through heater; and a tubing assembly interconnecting said tank, water pump, and heater to form a continuous loop capable of transporting water through said tank, heater, and pump, said tubing assembly including a section of flexible tubing having sufficient flexibility to permit manual bending thereof without the use of tools, said flexible tubing defining a nominal outer diameter when in an unstressed state, said tubing assembly further including at least one fitting securing said end of said section of flexible tubing to a selected one of said pump, heater, and tank, at least a portion of said fitting being substantially transparent such that material lodged within said fitting is visible from the exterior thereof, said fitting defining an inner sidewall surface having a truncated cone shape defining a tapered socket having an inner end portion and an outer end portion, said inner end portion having a diameter that is less than said nominal outer diameter of said flexible tubing, such that said tubing provides a tight interference fit with said fitting, said flexible tubing having sufficient flexibility to permit insertion thereof into said fitting to form said tight interference fit.

6. The spa system sefforth in claim 5, wherein:

said tubing has an outer diameter of about 2.375 inches; and said sockets each define an inner diameter proximate said annular ridge that is less than 2.375 inches to provide a tight interference fit with said tubing.

7. The spa system set forth in claim 5, wherein:

said tapered socket includes an annular ridge spaced apart from said peripheral edge to define a depth of at least about 2.45 inches.

8. The spa system set forth in claim 5, wherein:

said tapered socket includes an annular ridge spaced apart from said peripheral edge to define a depth of at least about 2.00 inches.

9. A method of assembling a spa system, comprising:

providing a tank, a powered water pump, a flow through heater, at least one section of flexible tubing, and at least one fitting having a socket shaped to receive an end portion of said flexible tubing, said fitting having a light-transmitting portion at said socket;

assembling said spa system, including inserting said end portion of said flexible tubing in said socket of said fitting;

distributing adhesive material around said end portion of said end portion of said tubing; and visually inspecting said adhesive to determine if the adhesive is distributed in a manner that provides a leak free joint.

10. The method of claim 9, wherein:

a plurality of said fittings and sections of flexible tubing are utilized to interconnect said tank, water pump, and flow through heater to provide a recirculating water system.

* * * * *

UNITED STATES PATENT AND TRADEMARK OFFICE
CERTIFICATE OF CORRECTION

PATENT NO. : 6,694,541 B2
DATED : February 24, 2004
INVENTOR(S) : Larry J. Nameche It is certified that error appears in the above-identified patent and that said Letters Patent is hereby corrected as shown below:

Column 6,
Line 23, "sefforth" should be -- set forth --.

Signed and Sealed this

Twenty-fifth Day of April, 2006

JON W. DUDAS
*Director of the United States Patent and Trademark Office*